United States Patent Office 3,544,544
Patented Dec. 1, 1970

3,544,544
PROCESS FOR IMPROVING THE ODOR OF PHOSPHORUS-SULFIDE ORGANIC COMPOUNDS
Dallas C. Armstrong, Belleville, and Taniel A. Garabedian, East St. Louis, Ill., assignors to Monsanto Company, St. Louis, Mo., a corporation of Delaware
No Drawing. Continuation of application Ser. No. 532,078, Mar. 7, 1966. This application Nov. 7, 1968, Ser. No. 774,165
Int. Cl. C07g 17/00; C10m 3/42
U.S. Cl. 260—139    9 Claims

ABSTRACT OF THE DISCLOSURE

A process for improving the odor of phosphorus- and sulfur-containing organic compounds by contacting such compounds with a gas containing oxygen in the presence of small amounts of ammonia. The phosphorus- and sulfur-containing organic compounds produced by the process of this invention are useful as lubricants per se or as additive to lubricating oils.

This application is a continuation of application Ser. No. 532,078, filed Mar. 7, 1966 now abandoned.

This invention relates to an improvement in a process for the preparation of phosphorus and sulfur-containing organic products and more particularly this invention relates to an improvement in a process for the preparation of a substantially odor-free phosphorus and sulfur-containing organic product which has a reduced tendency to corrode metal mechanical members in contact with fluid compositions containing said products.

It has heretofore been found that phosphorus and sulfur-containing materials, while useful as lubricating oil additives, are objectionable due to the odor which is present in these products and to corrosion of mechanical members in contact with fluid compositions containing these products. Base neutralized phosphorus and sulfur-containing hydrocarbons have suffered from the same detrimental properties. Previous prior art attempts to neutralize the offensive odor characteristics of the phosphorus and sulfur-containing materials include the physical incorporation of masking compounds to mask the odor or consisted of purging such materials with an inert gas to remove any volatile odor-causing compounds.

These methods, however, have been inadequate since the detrimental odor characteristics of these products are still present in a concentration sufficient to detract from the overall quality of the additive or fluid composition containing the additive since mere purging only removes (to a limited extent) highly volatile compounds and corrosion of mechanical members still occurs to an extent sufficient to cause premature failure of mechanical parts. The mechanical parts which are particularly affected are those at pressure sensitive points in an engine such as main bearings and connecting rod bearings. Corrosion of these bearing surfaces alters their close tolerances to an extent sufficient to greatly decrease engine operating efficiency and necessitate premature removal thereof.

It has now been found that odor-producing characteristics of phosphorus and sulfur-containing organic products, hereinafter referred to as a product, can be reduced to a level whereby no objectionable odor remains and the tendency of phosphorus and sulfur-containing organic products and fluid compositions containing said products to corrode mechanical members can be greatly reduced by the contacting of a phosphorus and sulfur-containing organic product with oxygen at a temperature of from about 50° C. to about 250° C., preferably from about 75° C. to about 200° C. The oxygen is generally contacted with the phosphorus and sulfur-containing organic product for a time sufficient to remove odor-producing and corrosion characteristics of the product. The oxygen contact time is not critical and can be varied over a wide range and is generally from about one hour to about 16 hours, preferably from about five hours to about ten hours. The flow rate of oxygen can be varied over a wide range, and a flow rate of oxygen is used which will substantially eliminate the odor-producing and corrosion characteristics of the product. The flow rate of oxygen is generally from about 0.005 to about 1.00 cubic feet per minute per gallon of product, preferably from about 0.01 to about 0.40 cubic feet per minute per gallon of product present although the flow rate of oxygen is not critical. The flow rate of oxygen is generally a function of temperature and the amount of oxygen needed to substantially reduce the odor characteristics of the product will decrease as the temperature of contacting is increased.

While the interaction of a phosphorus and sulfur-containing organic product with oxygen has been found to reduce odor and corrosion of mechanical members in contact with fluid compositions comprising said product, the length of time for achieving these results is longer than would be desirable from a commercial standpoint. In addition to the treatment of the phosphorus and sulfur-containing organic product with oxygen, it has been found that the time required for interaction of the oxygen with the product can be greatly reduced by conducting the contacting in the presence of ammonia. The use of ammonia together with oxygen produces a product which is substantially odor free and which exhibits a reduced tendency to corrode mechanical members in contact with said product and in addition exhibits a high degree of stability as to odor or corrosiveness which develops upon storage or use over an extended period of time. The total ammonia utilized in carrying out the process of this invention is generally in a concentration of moles of ammonia per gallon of phosphorus and sulfur-containing organic product of from about 0.10 mole to about 2.00 moles, preferably from about 0.25 mole to about 1.00 mole. When ammonia is utilized in the process of this invention, the time for oxygen contact is considerably less and oxygen is generally in contact with the product for a time of from about one-half hour to about eight hours, preferably from about one hour to about five hours. The flow rate of oxygen using ammonia is generally from about 0.005 to about 1 cubic feet per minute per gallon of product, preferably from about 0.01 to about 0.40 cubic feet per minute per gallon of product present. The use of ammonia brings about a considerable reduction in the time required for the process of this invention. The ammonia can be added to the phosphorus and sulfur-containing organic product separately or together with the oxygen stream and can be added continuously or intermittently in order to reduce the contacting time of the oxygen with the product. The time required to reduce the odor and corrosion tendencies of the phosphorus and sulfur-containing organic product is generally a function of the particular phosphorus and sulfur-containing organic material. The temperature of the phosphorus and sulfur-containing organic product during oxygen-ammonia contacting will generally be the same with oxygen alone, although the only limitation as to temperature is the decomposition temperature of the phosphorus and sulfur-containing organic product.

While this invention contemplates the use of oxygen in carrying out the process of this invention, it has generally been found that gases which contain oxygen together with other gases can be employed in the process of this invention. In particular, it has been found that air can be used as a source of oxygen. The air in addition can contain water vapor as it has been found that the presence of water is not deleterious to carrying out the process of this invention.

In the preparation of the phosphorus and sulfur-containing organic product, a hydrocarbon material can be reacted with a phosphorus and sulfur-containing compound, typical examples of which are $P_2S_3$, $P_4S_3$, $P_4S_7$ and $P_2S_5$. The preferred phosphorus-sulfide compound for producing the phosphorus and sulfur-containing organic products is phosphorus pentasulfide. To prepare the phosphorus and sulfur-containing organic product, the phosphorus-sulfide compound, preferably phosphorus pentasulfide, is added to a hydrocarbon material capable of reacting with the phosphorus-sulfide compound. In general, the ratio of the phosphorus-sulfide compound to the hydrocarbon compound is from about 5% by weight to about 60% by weight, preferably from about 10% to about 40% by weight of phosphorus-sulfide compound to the hydrocarbon material. The temperature of reaction is generally in the range of from about 225° F. to about 600° F. and a diluent can be used to facilitate the reaction. Typical diluents are mineral oil, low molecular aliphatic materials and light hydrocarbon fractions.

The hydrocarbon constituent of this reaction can be a hydrocarbon polymers from a mono-olefin, hereinafter referred to as an olefin polymer, resulting from the polymerization of low molecular weight mono-olefinic hydrocarbons such as propylene, butylenes and amylenes or the copolymers obtained by the polymerization of hydrocarbon mixtures of iso-olefins and mono-olefins or terpolymers formed from hydrocarbon mixtures of iso-olefins, mono-olefins and di-olefins.

The polymers generally have a molecular weight in the range of from about 140 to about 50,000 or higher, and preferably from about 500 to about 10,000. The polymers can be obtained by the polymerization of these olefins or mixtures thereof in the presence of a catalyst such as boron trifluoride, sulfuric acid, phosphoric acid, aluminum chloride or other suitable catalyst.

A typical example of the preparation of a polymer of propylene is the polymerization of propylene in the liquid phase in the presence of an aluminum chloride catalyst and a co-catalyst, such as a trace of water or an alkyl halide. The catalyst can be prepared in an aliphatic solvent such as iso-octane and the propylene passed upwardly through the catalyst solution at a temperature from 50° F. to 110° F.

Other preferred olefins which can be reacted with a phosphorus-sulfide compound are prepared from the dehydrohalogenation of chlorinated paraffin waxes, said waxes having from 13 to 30 carbon atoms present in the hydrocarbon chain. Also contemplated within the scope of this invention are the reaction products of phosphorus-sulfide compounds with an aromatic hydrocarbon, such as benzene, cumene, xylene, diphenyl and the like, and with alkylated aromatic hydrocarbons such as dodecylbenzene.

In addition to the hydrocarbons as are set out above, this invention includes hydrocarbons such as terpenes and turpentine and typical cycloaliphatic and mixed aliphatic-cycloaliphatic-aromatic hydrocarbons of which p-cumene, camphoren, cyclene, bornylene, camphene, alpha-pinene, sylvestrene, dipentene and 1,8-terpin are examples. In addition, phosphorus, sulfur and oxygen-containing organic compounds are also included within the term phosphorus and sulfur-containing organic compounds. Typical oxygen-containing organic compounds are alcohol, compounds such as ketones, aldehydes and amides, compounds such as esters and ethers.

These oxygen-containing organic compounds can contain a plurality of functional oxygen groups, i.e., polyalcohols, polyacids, polyamides, polyethers, polyketones, polyesters and polyaldehydes. Many mixed classes also are available, such as hydroxy acids, esters, ethers, amides, ketones and aldehydes. Usually from 1 to 3 like or unlike functional oxygen groups are sufficient although higher polyfunctional compounds could be utilized for special effects. Saturated and unsaturated aliphatic and cycloaliphatic compounds, aromatic compounds, and mixed aliphatic-aromatic, aliphatic-cycloaliphatic and cycloaliphatic-aromatic compounds are within the scope of the invention. Desirably, oxygen-containing organic compounds have a rather high molecular weight and a boiling point above the reaction temperature, properties usually found in compounds of at least eight carbon atoms. However, if the substance has a low boiling point, the reaction may be conducted under pressure, if desired. Preferably compounds having 12 or more carbon atoms, and generally not over 20 carbon atoms are employed, although compounds of up to 52 carbon atoms or more are suitable. Also, halogenated derivatives of any of these classes of compounds are suitable.

Illustrative of some ester materials, i.e., oxygen-containing organic compounds, are: degras, lanolin, sperm oil, beeswax, ester waxes, butyl stearate, ethyl lactate, methyl oleate, methyl palmitate, butyl ricinoleate, butyl phthalate, methyl stearate, methyl dichlorostearate, methyl chloronaphthenate, coconut oil, palm oil, babassu oil, hydrogenated linseed, coconut and other vegetable and fatty oils.

A few ethers are di(dodecyl) ether, methyl stearyl ether, ethylene glycol monoethers and ethylene glycol chlorohydrin.

Typical acids are palmitic acid, abietic acid, rosin, modified rosin, myristic acid, naphthalic acid, dichloropalmitic acid, naphthoic acid, benzoic acid, naphthenic acids, hydroxystearic acid, dihydroxybenzoic acids, hydroxynaphthenic acids, dihydroxystearic acid, chlorobenzoic acid, dichlorodihydroxystearic acid, lactones, oxidized petroleum fatty acids or other oxygen-containing or acidic petroleum products, as oxidized wax, kerosene, gas oil or other oxidized petroleum oil.

As is well known, phosphorus and sulfur-containing organic compound reaction products can also be utilized in the form of their metal or ester derivatives, or mixtures of these derivatives, with the original reaction product. These derivatives are formed from compounds capable of replacing an acid hydrogen atom in the phosphorus and sulfide-containing organic reaction product, although the formation of the above derivatives may itself involve replacement of an acid hydrogen in the reaction product.

The metal derivatives may be formed from one or more metal compounds, such as their sulfides, oxides, hydroxides, carbides and cyanamides. The preferred metals are those of Groups I, II and III of the Periodic Table, such as potassium, sodium, calcium, magnesium, beryllium, zinc, barium and aluminum. For some purposes, the heavier metals are especially useful, such as chromium, cadmium, tin, lead, antimony, bismuth, arsenic and the like.

The metal derivatives may be formed by reacting the phosphorus and sulfur-containing organic reaction product with the corresponding metal compound at temperatures in the range of about 40° C. to about 200° C., a temperature in the range of about 50° C. to 160° C. being preferred.

The non-limiting examples that follow permit a better appreciation of the process of this invention.

EXAMPLE 1

To a reactor was added 1.2 gallons of a phosphorus pentasulfide-polypropylene (800 molecular weight) reaction product which had been hydrolized with steam and treated with barium oxide in the presence of water and methanol. The barium phospho-sulfurized polypropylene had been carbonated with carbon dioxide for a period of about two hours. The above product was heated in the reactor to 150° C. and about 4 grams of ammonia was bubbled into the product over a period of about four to five minutes. Air was introduced into the reaction vessel for a period of about one hour at a rate of about four cubic feed per hour. Ammonia (4 to 5 grams) was again introduced into the reaction system for a period of about four to five minutes. Air was again introduced into the reaction system for an additional two hours at the rate of four cubic feet per hour.

EXAMPLE 2

To a reactor was added 600 grams of a hydrolyzed phosphorus pentasulfide polypropylene (800 molecular weight) reaction product. The temperature of the phosphorus pentasulfide polypropylene reaction product was increased to 150° C. To the above reactor was introduced, below the surface of the liquid, air at a rate of two liters per minute and ammonia at a rate of two liters per minute. The air was introduced for a period of one and one-half hours and the ammonia for a period of five minutes.

In the following examples as are listed in Table I, a two-gallon reactor with a gas inlet tube and means for evacuating the reactor was used. To the reactor was charged 1.2 gallons of a barium-neutralized phosphorus pentasulfide polypropylene reaction product which had been carbonated with carbon dioxide. The reaction conditions as to temperature, pressure, flow rate and time are given in Table I and in addition the result obtained as to odor level is given with reference to a standard. The standard that was used is a standard for a phosphorus and sulfur-containing organic product wherein no odor could be detected. Examples wherein the odor was found to be standard indicates that there was no objectionable odor present after treatment, whereas below standard indicates that there was considerable objectionable odor remaining in the product after treatment.

II effectively demonstrate the effectiveness of oxygen and the effect of oxygen in the presence of ammonia.

The amount of the final product produced by the process of this invention to be incorporated in an oil or grease will depend upon the characteristics of the oil or grease and the intended use. Some oils have more of a tendency to corrode metals or to form acids, sludges and lacquer deposits than others, and such oils require larger quantities of the addition agent. Also, oils that are intended for use at higher temperatures require larger amounts of the additive. In general, from about 1 to about 10% of the additive is employed. Under some circumstances, amounts as low as 0.01% show a significant improvement. Since the phosphorus and sulfur-containing organic compound additive is itself a lubricant, there is no upper limit. However, it may be uneconomical to include in the lubricant more of the additive than is necessary to impart the desired properties. Generally, not over 50% will be employed.

If desired, the additives produced by the process of this invention can be used together with other oil addition agents, e.g., pour point depressants or film strength agents. In some instances it is desirable to include a lubricating oil containing the additive as agent for improving the clarity of the oil, e.g., lecithin, lauryl alcohol and the like, which are well known to the art, and in order to prevent foaming of the oil it is desirable in some cases to add small amounts of tetraamyl silicate, an aryl alkyl carbonate or polyalkyl silicone.

While this invention has been described with respect to various specific examples and embodiments, it is understood that the invention is not limited thereto and that it

TABLE I

| System | Temperature of product, °C. | Pressure (mm.) | Flow rate and total weight | Time (hours) | Odor |
|---|---|---|---|---|---|
| Example No.: | | | | | |
| 3 _____ No gas (Vacuum) _____ | 100 | 25 | | 3 | Below standard. |
| 4 _____ do _____ | 125 | 25 | | 3 | Do. |
| 5 _____ do _____ | 150 | 25 | | 3 | Do. |
| 6 _____ do _____ | 150 | 25 | | 5 | Do. |
| 7 _____ Nitrogen (N₂) _____ | 150 | Atmospheric | 3 cubic feet per hour | 3 | Do. |
| 8 _____ do _____ | 150 | 100 | | 3 | Do. |
| 9 _____ N₂NH₃ _____ | 150 | | 3 cubic feet per hour | 3 | Do. |
| 10 _____ Carbon dioxide (CO₂) _____ | 150 | Atmospheric | | 3 | Do. |
| 11 _____ do _____ | 150 | 100 | 16 cubic feet per hour | 3 | Do. |
| 12 _____ 80% nitrogen, 20% oxygen _____ | 100 | Atmospheric | | 3 | Do. |
| 13 _____ do _____ | 150 | do | | 3 | Do. |
| 14 _____ do _____ | 150 | do | | 7 | Standard. |
| 15 _____ NH₃/80% nitrogen, 20% oxygen _____ | 150 | do | 40 gr. NH₃ and 35 cubic feet of air | 3 | Do. |
| 16 _____ do _____ | 130 | do | 12 gr. NH₃ and 45 cubic feet of air | 3 | Do. |
| 17 _____ do _____ | 150 | do | 6 gr. NH₃ and 20 cubic feet of air | 3 | Do. |
| 18 _____ do _____ | 150 | do | 8 gr. NH₃ and 8 cubic feet of air | 2½ | Do. |
| 19 _____ do _____ | 150 | do | 8 gr. NH₃ and 12 cubic feet of air | 5 | Do. |
| Product of Ex. 1 after treatment. | | | | | Do. |
| Product of Ex. 2 after treatment. | | | | | Do. |

In addition to the measurement of odor level as is shown in Table I, the product of Example 1 was run in a test to determine the extent of copper corrosion before and after treatment with an oxygen-ammonia system. The test used was ASTM Modified D-130-56. The results of this test are shown in Table II.

TABLE II

| Product | Result |
|---|---|
| Example 1 before treatment | Extensive copper corrosion. |
| Example 1 after treatment | Rating 1A—No copper corrosion. |

The results obtained as are shown in Table I and Table II from treatment by various systems of a phosphorus and sulfur-containing organic product demonstrate that prior art methods, such as vacuum and purging with an inert gas are insufficient to produce phosphorus and sulfur-containing organic products with non-objectionable odor levels and which in addition are non-corrosive to normally sulfur corrosive metals, such as copper. Table I and Table II effectively demonstrate the effectiveness of oxygen and can be variously practiced within the scope of the following claims.

What is claimed is:

1. A process for improving the odor of phosphorus-sulfide-organic olefinic hydrocarbon polymeric compounds which comprises heating said organic compound to a temperature of from about 50° C. to about 250° C., and intimately contacting said organic compound with a gas containing molecular oxygen in the presence of ammonia, said ammonia being present in amounts of from 0.10 to about 2.00 moles per gallon of said organic compound and wherein said gas is passed through said organic compound at a rate of from about 0.005 to 1.00 cubic feet per minute per gallon of said organic compound.

2. A process of claim 1 wherein the phosphorus-sulfide containing organic product is an alkaline earth metal salt of a phosphorus and sulfur-containing olefin polymer.

3. A process as in claim 2 wherein the gas is air.

4. A process as in claim 1 wherein the gas is air.

5. A process as in claim 1 wherein the gas containing molecular oxygen is oxygen.

6. A process of claim 1 wherein the phosphorus-sulfide containing organic product is a barium salt of a phosphorus and sulfur-containing olefin polymer.

7. A process of claim 6 wherein the olefin polymer is a polymer of a butylene.

8. A process of claim 6 wherein the olefin polymer is a polymer of propylene.

9. A process as in claim 8 wherein the gas is air.

References Cited

UNITED STATES PATENTS 2,805,217  9/1957  Loughram _____ 260—139

CHARLES B. PARKER, Primary Examiner

D. R. PHILLIPS, Assistant Examiner

U.S. Cl. X.R.

260—125; 252—46.6